United States Patent [19]
Fonseca

[11] Patent Number: 5,629,977
[45] Date of Patent: May 13, 1997

[54] METHOD AND ASSEMBLY FOR PROVIDING TELEPHONE CALLING CREDIT IN COMBINATION WITH A GREETING CARD

[76] Inventor: David Fonseca, 3208 Saddlehorn Dr., Lawrence, Kans. 66049

[21] Appl. No.: 32,797

[22] Filed: Mar. 17, 1993

[51] Int. Cl.$^6$ .............................. H04M 17/00; G06K 5/00; B42D 15/00
[52] U.S. Cl. .................... 379/144; 279/112; 235/380; 283/117; 395/2.81
[58] Field of Search ..................... 379/88, 89, 91, 379/144, 143, 112, 113, 355; 283/117; 229/92.8; 235/380; 395/2.81

[56] References Cited

U.S. PATENT DOCUMENTS

| | | | |
|---|---|---|---|
| 4,941,172 | 7/1990 | Winebaum et al. | 379/355 |
| 5,086,457 | 2/1992 | Barraud et al. | 379/144 |
| 5,251,251 | 10/1993 | Barber et al. | 379/88 X |
| 5,261,251 | 11/1993 | Barber et al. | 379/88 X |

FOREIGN PATENT DOCUMENTS

| | | | |
|---|---|---|---|
| 1251942 | 10/1989 | Japan | 379/144 |
| 2128589 | 5/1990 | Japan | 379/144 |

*Primary Examiner*—Curtis Kuntz
*Assistant Examiner*—Paul Loomis
*Attorney, Agent, or Firm*—Senniger, Powers, Leavitt & Roedel

[57] ABSTRACT

A method and assembly for allowing prepaid telephone calling credit to be provided in conjunction with a greeting card. The greeting card assembly generally comprises a greeting card, an envelope having an inside pocket adapted to receive and hold the greeting card, and a unique visually discernible calling card access identifier. The access identifier designates a prepaid account having a predetermined amount of telephone calling credit against which telephone calls can be charged. In a preferred embodiment, the liner is attached to the envelope and the access identifier is affixed to the liner in the envelope. A section of the liner is removable and surrounds the access identifier to facilitate carrying of the access identifier apart from the envelope. Also in this embodiment, an opaque covering is placed over the access identifier prior to sale of the assembly to prevent misappropriation of the access identifier.

37 Claims, 2 Drawing Sheets

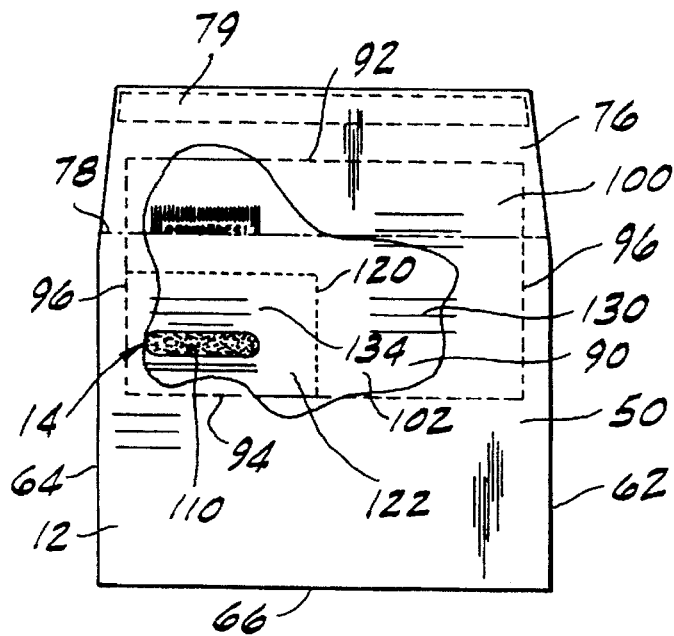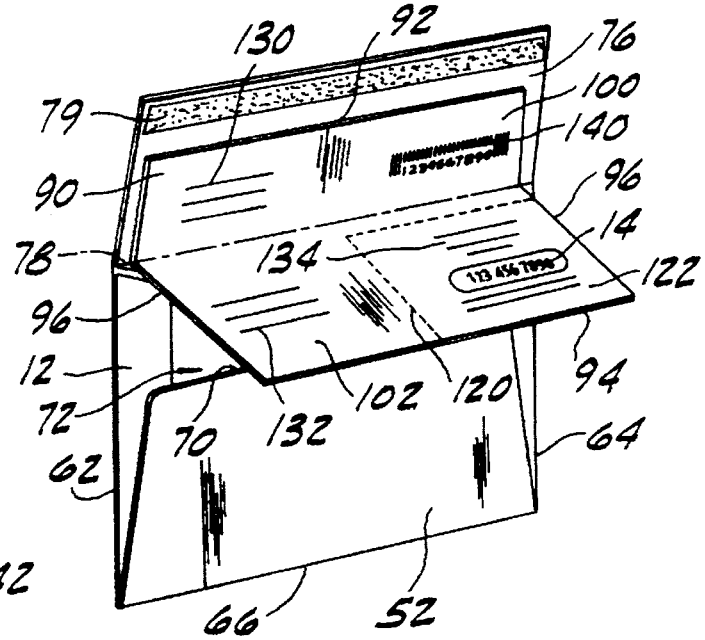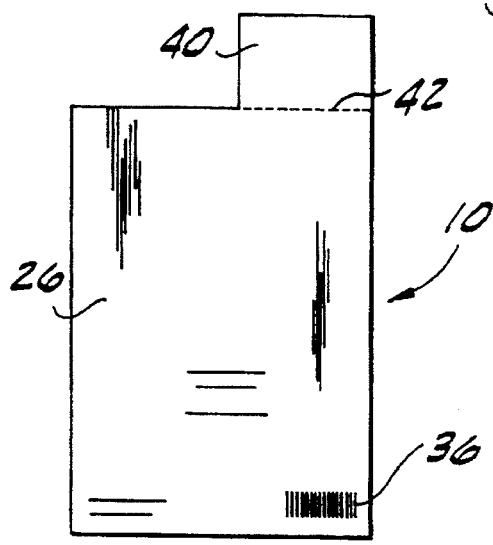

METHOD AND ASSEMBLY FOR PROVIDING TELEPHONE CALLING CREDIT IN COMBINATION WITH A GREETING CARD

BACKGROUND OF THE INVENTION

This invention relates in general to the telephone industry, and in particular to a device and method that allows a consumer to provide prepaid calling credit.

Greeting cards, such as birthday cards and friendship cards, etc., have traditionally been used to communicate with a friend or relative on special occasions. Greeting cards are also used to communicate with persons who have not had an opportunity to speak to each other for an extended period of time. This is especially true for persons living in different cities.

A long distance phone call is another way for persons separated geographically to communicate from time to time. A phone call provides the benefit of interactive conversation, and further allows for more detailed discussions than are generally associated with greeting cards, which are often used to provide a memento of an occasion along with an accompanying short note. Thus, the two forms of communication provide related but different benefits.

It is, of course, possible for the sender of a greeting card to follow up with a telephone call to the intended recipient to achieve the benefits of both forms of communication. However, it is difficult, if not impossible, to predict how long it will take for mail to be delivered from one city to another. Thus, there is the possibility that the sender will guess incorrectly and place a telephone call to the intended recipient prior to delivery of the greeting card, thereby spoiling the potential surprise of the card and the written note found inside. Further, some intended recipients are extremely busy, and, thus, it may be difficult to reach such persons with a follow up telephone call.

Another possible scenario is that the recipient of the card could place a telephone call to the sender after receiving the greeting card, either because the sender requested such a telephone call in a written note inside the card, or because the recipient desired to contact the sender by telephone or thought such a gesture would be courteous. However, when the recipient does not have enough money to afford a long distance telephone call, such as, for example, a teenager or college student, they may not be able to place such a telephone call. Also, the recipient might initially intend to place such a return telephone call, but might never actually take the time to follow through and actually place the call.

Further, there may be instances when a person desires to make a gift of a prepaid amount of long distance credit to another person. One example is a parent providing a child with such a gift. While providing the child with the parent's long distance calling card number might be one way of effectuating the result, there is, of course, the risk that the child will incur a larger long distance bill than either intended or desired by the parent.

To date, there have not been any attempts to provide a method and system for combining the benefits of a greeting card with the benefits of a long distance telephone call. It is therefore desirable to provide a method and assembly for facilitating and encouraging a return telephone call from a geographically distant recipient of a greeting card. It is also desirable to provide a method and assembly for making a gift of a prepaid, predetermined amount of calling credit accompanied by a greeting card which may also commemorate a special occasion.

SUMMARY OF THE INVENTION

It is therefore an object of the present invention to provide a greeting card assembly and a method for constructing and implementing such an assembly which combines the benefits of a greeting card with the benefits of a phone call by combining a greeting card with a system for including a predetermined, prepaid amount of calling credit with the greeting card.

Another object of the present invention is to provide such an assembly and method for constructing and implementing the same which allows the assembly to be sold through retail outlets and which minimizes the opportunity for misappropriation of the long distance credit.

An additional object of the present invention is to provide such an assembly and method which allows misappropriated prepaid long distance credit to be readily ascertained so that consumers can be protected from purchasing an assembly having a prepaid credit which has already been misappropriated by an unscrupulous person.

Another object of the present invention is to provide a greeting card assembly having an account number designating a prepaid calling credit account associated therewith which is affixed to an envelope sized to receive the greeting card. A further object is to releasably attach a calling card having the account number to the envelope. A more particular object is to integrally form the calling card on a liner attached to the envelope, whereby the calling card can be separated from the liner so as to facilitate storage of the account number on the calling card for later referral, and in addition, so that the envelope can be maintained behind the counter of a retail outlet to minimize the opportunity for misappropriating the account number, and so that the greeting cards can be maintained apart from the envelopes in a display rack in the retail outlet for browsing of the desired card without risking exposure of the account number.

Another object of the present invention is to provide an indicator removably attached to the greeting card, alerting the purchaser of the card to the need for a special envelope which provides prepaid calling credit to the intended recipient.

And yet another object of the present invention is to provide an opaque covering over the account number to prevent viewing of the account number prior to sale, so that the opaque covering is readily removable to allow viewing and use of the account number after sale, and to also provide a product identifier code in order to facilitate inventory tracking of the greeting card assemblies. A more particular object is to provide such a code on the liner of the envelope and on the greeting card to allow for individual tracking of the cards and envelopes.

To accomplish these and related objectives, a greeting card assembly, and method for constructing and implementing such an assembly, is disclosed which combines a greeting card with a method for including a prepaid, predetermined amount of calling credit with the greeting card. The greeting card assembly generally comprises a greeting card which may contain a greeting, an envelope having an inside pocket sized to receive and hold the greeting card, and a unique, visually discernible calling card access identifier, such as an account number. The access identifier designates a prepaid account having a predetermined amount of telephone calling credit against which telephone calls can be charged.

In a preferred embodiment, the access identifier is affixed to the envelope. More particularly, in the preferred embodiment, a liner is further provided, and the access identifier is affixed to the liner. The liner comprises a first portion, and a second portion. The first portion of the liner is secured to the envelope, and the second portion of the envelope is movably attached to the first portion and tucks inside the envelope for storage prior to sale. In this embodiment, the access identifier is affixed to the second portion of the liner, and perforations are preferably provided on the second portion of the liner around the access identifier to facilitate removal of a section of the liner having the access identifier thereon. Thus, the removed section of the liner can be stored in a wallet, or the like, for later referral to the access identifier.

Also, in a preferred embodiment, an opaque covering, such as a colored wax, is affixed over the access identifier to prevent viewing of the access identifier prior to sale. The opaque coating is adapted to be readily removed or scraped off of the access identifier to reveal the access identifier. In this embodiment, a product code is also provided with the greeting card and with the liner of the envelope to facilitate individual inventory tracking of the greeting cards and the envelopes. A transparent coating can be applied over the access identifier and under the opaque coating to prevent inadvertent removal of the access identifier from the liner, and also for providing a smooth bonding surface for the opaque coating.

Thus, the present invention overcomes the problems associated with the prior art. The present invention provides an assembly and method for providing prepaid telephone calling credit with a greeting card.

BRIEF DESCRIPTION OF THE DRAWINGS

In the accompanying drawings which form a part of the specification and are to be read in conjunction therewith and in which like reference numerals are used to indicate like parts in the various views:

FIG. 3 is a back elevational view of the envelope with a cutaway portion showing the liner and access identifier of the present invention;

FIG. 4 is a perspective view of the envelope, showing the second portion of the liner removed from the inside of the envelope; and FIG. 5 is a back elevational view of the greeting card.

DETAILED DESCRIPTION OF THE PREFERRED EMBODIMENT

Figure 1:
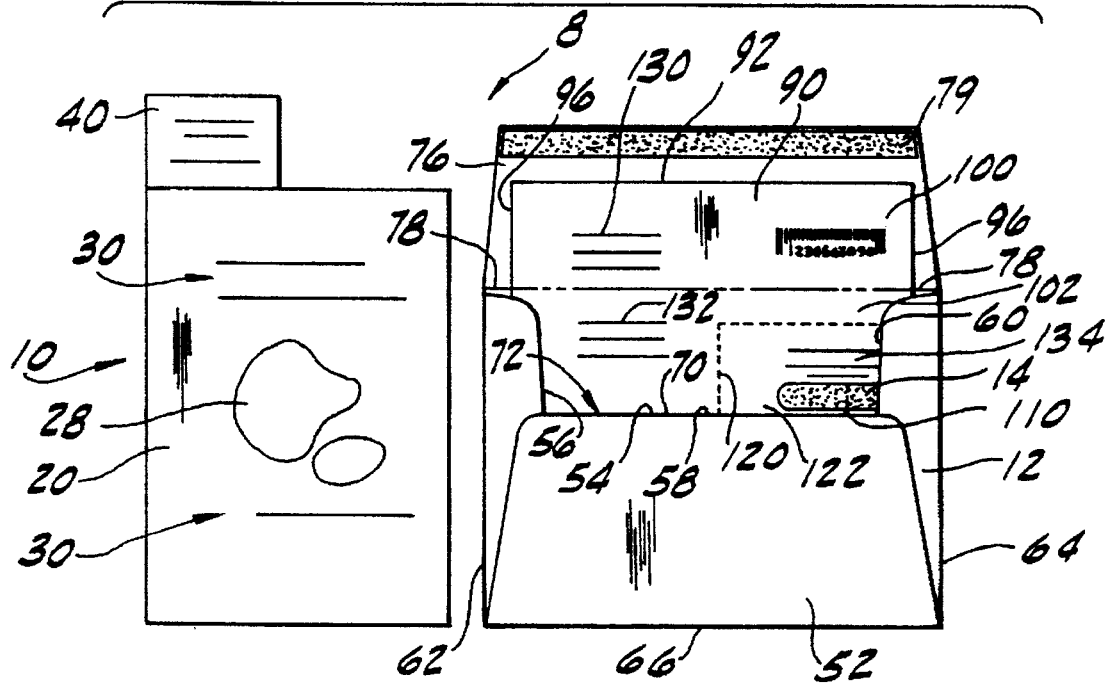
FIG. 1 is a front elevational view showing the greeting card and envelope of the present invention.
Figure 2:
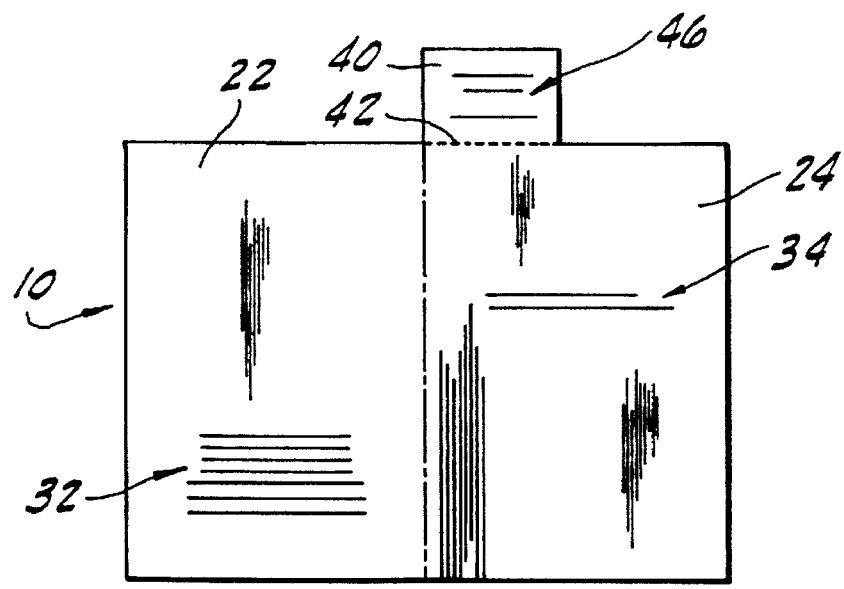
FIG. 2 is a front elevational view of the greeting card opened up to reveal the inside greeting.

Referring to the drawings, and at first to FIG. 1, the greeting card assembly of the present invention is generally designated 8. The greeting card assembly 8 of the present invention generally comprises a greeting card 10, an envelope 12, and a calling card access identifier 14 (shown in FIG. 4).

The greeting card 10 has a configuration well-known in the art. The greeting card comprises a cover page 20, middle pages 22 and 24, and a back page 26. As is typical in the industry, the cover page 20 includes a picture 28 and a greeting 30. In the preferred embodiment, the middle page 22 includes instructions 32 relating to the greeting card assembly 8 for making long distance calls. The instructions 32 can preferably include the following statements:

You have just received a gift of free long distance calling time. This greeting card entitles the recipient to the amount of prepaid long distance calling time indicated on the inside of the envelope flap. Using the instructions printed on the envelope flap, call to anywhere from any Touch Tone telephone in the Continental United States, anytime. (See envelope flap for details and restrictions.)

This particular suggested language for instructions 32 is helpful in affecting the method for providing prepaid long distance credit with a greeting card, as will be described in greater detail below.

The middle page 24 may include an additional greeting, such as a "punch line" greeting 34, which is typically provided with the greeting card 10 to complete the greeting 30 on the cover page 20. Also, the top portion of middle page 22, as well as the top and bottom portions of middle page 24, can be blank to allow the sender of the greeting card to provide a personalized written greeting thereon.

The back page 26 includes a universal product code identifier (UPC identifier) 36. The UPC identifier 36 is affixed to the greeting card 10 by known means, such as printing or the like. The UPC identifier 36 provides product information in bar code form that a suitably equipped retailer can use to access pricing information for the greeting card assembly 8. The use of UPC identifiers is well-known in the merchandising field, and, therefore, will not be described further herein.

The greeting card 10 further comprises a tab portion 40 which is preferably generally rectangular shaped. The tab portion 40 is attached to the greeting card 10 by perforations 42, and the tab portion 40 extends generally upward. The greeting cards 10 are adapted to be displayed in a display rack (not shown), and the tab portions 40 extend above the greeting card 10 to alert the purchaser that the envelope 12 is necessary for operating the greeting card assembly to provide prepaid long distance service to the intended recipient. Thus, the tab portion 40 preferably includes an instruction section 46 which could read as follows:

"Calling card is invalid without special envelope. Ask clerk for assistance."

The phrase "special envelope" could be highlighted to draw the consumer's attention to this important fact. Prior to mailing the greeting card 10, and thus prior to placing the greeting card 10 in the envelope 12, the tab portion 40 can be removed from the greeting card at perforations 42.

The envelope 12 is a well-known means for holding and sending the greeting card 10. The envelope 12 includes a back portion 50 and a front portion 52 with a cutaway recess 54 defined by sides 56, 58, and 60. The back portion 50 and the front portion 52 are connected at sides edges 62 and 64, and at the bottom edge 66. The back portion 50 and the front portion 52 form an opening 70 sized to receive the greeting card 10, and an inside pocket 72 sized to snugly house the greeting card 10.

The envelope 12 also comprises a flap 76 movably connected to the back portion 50 of the envelope between an open position (shown in FIGS. 1 and 4) and a closed position (not shown). As is well-known in the art, the back portion 50, the front portion 52, and the flap 76 of the envelope 12 are formed of one piece of flexible material, such as paper. The paper is scored to provide appropriate folds for forming the opening 70 and inside pocket 72, as well as for providing the movable connection 78 of the flap 76 to the back portion 50. The envelope also comprises a convention sticky film 79 affixed to the flap 76 of envelope 12 for sealing the envelope. Further, the outside of the envelope should not indicate that calling credit is contained in the envelope to avoid theft of the greeting card assembly 8 during transit in the mail.

In a preferred embodiment, the greeting card assembly 8 further comprises a liner 90. The liner 90 is formed of a material, such as paper, adapted to receive printed matter which will be described below. The shape of the liner 90 is preferably generally rectangular, formed by top edge 92, bottom edge 94 (shown in FIG. 4), and side edges 96. The liner 90 comprises a first portion 100 extending generally between the top edge 92 and the movable connection 78 of the flap 76 to the back portion 50 of envelope 12, and the side edges 96. The liner 90 further comprises a second portion 102 which extends between the movable connection 78 and the bottom edge 94, and between side edges 96. The first portion 100 is secured to the flap 76 by known means, such as glue or other adhesives. The second portion 102 of liner 90 is sized to be tucked through opening 70 within the inside pocket 72 of envelope 12 (as shown in FIG. 1). As will be described in greater detail below, the second portion 102 of liner 90 can be pulled from the inside pocket 72 of envelope 12 (shown in FIG. 4) to facilitate removal of a section of liner 90 surrounding the access identifier 14 so that the access identifier is maintained on a smaller medium, capable of being stored in a wallet or the like.

The calling card access identifier 14 is affixed to the second portion 102 of liner 90 by known means, such as by printing it on the card in a suitable ink or the like, to thereby permanently attach or affix the access identifier 14 to the liner 90. The calling card access identifier 14 can be of a sufficient quantity of characters to reasonably preclude someone from guessing the composition of the access identifier. The access identifier is preferably a number, having between 7 and 14 characters. However, the access identifier 14 could be composed of any numbers or letters, but is preferably a nonsequential number randomly generated by a computer for each specific greeting card assembly 8 and comprising a combination of letters and digits to uniquely identify a particular greeting card assembly and act as a security identifier for access to the long distance telephone network and use thereof. Referring to FIG. 1, the calling card access identifier 14 is hidden by the opaque covering 110 (described below) when the card is purchased. The location of the access identifier 14 is shown by the phantom dashed lines in FIG. 1. Referring to FIG. 4, the opaque covering 110 has been removed by the user, and the access identifier 14 is thereby revealed.

Also in this embodiment of the invention, after the ink of the calling card access identifier 14 is affixed to the liner 90, a protective transparent coating (not shown) is then permanently affixed to the liner 90 over the area of the access identifier 14. This transparent coating preferably comprises a transparent, hardenable material, such as transparent enamel, UV varnish, lacquer paint, or other suitable conventionally available transparent material. Material is flowed, sprayed, or otherwise affixed by conventional techniques onto the card. This operation may be carried out as part of the printing process. It is to be understood that a transparent material applied in other than a liquid or semi-liquid form could also be employed if desired.

The opaque covering 110 is affixed to the liner 90 over the transparent coating, but is removable from the liner 90 to allow the user to view the calling card access identifier 14 after the greeting card assembly 8 has been purchased. The opaque covering 110 prevents misappropriation of the calling card access identifier 14 prior to the purchase of the greeting card assembly. The protective transparent coating forms a smooth bonding surface to which the opaque covering 110 may reliably and evenly adhere. Without such a protective coating, the opaque covering 110 might not reliably or fully adhere to the liner 90, resulting in irregularities and unevenness in the surface of the opaque covering 110. It is essential that the calling card access identifier 14 is completely hidden by the opaque covering 110, which covering can be colored or overprinted for additional coverage. Further, the protective transparent coating prevents inadvertent removal of the access identifier 14 from the line 90 when the opaque covering 110 is being scraped or removed from the liner 90.

In this embodiment, the opaque covering 110 is a colored wax coating which can be scraped from the liner 90 to reveal the hidden calling card access identifier 14. Such colored wax coatings and means of affixation to paper or cardstock and the like are well-known in the art, and therefore will not be described further herein. The coating may alternatively be a latex material, enamel material, or any other suitable selectively removable opaque covering material conventionally available.

The liner 90 can also comprise perforations 120. The perforations preferably form a generally rectangular-shaped section, sized similar to a conventional telephone calling card. In use, the second portion 102 of the liner 90 can be pulled from the inside pocket 72 of envelope 12, and the perforations 120 can be severed so that the calling card 122 can be separated from the liner 90. Thus, the calling card 122 is of a traditional, compact size for carrying in a wallet or the like. It is to be understood that there are other methods for providing a conventionally sized credit card with the envelope 12. For example, a thin plastic calling card could be releasably affixed to the liner 90 or the envelope 12 by known means such as releasable glue.

The liner 90 also includes instructional portions 130, 132, and 134, which include information relating to use of the calling card 122, as well as separation of the card 122 from the liner 90.

The liner 90 also comprises a product reference identifier 140 which is affixed to the liner 90 by means well-known in the art, such as printing or similar means. The product reference identifier 140 could be any numbers or letters, but is preferably a sequential and unique number (possibly consisting of a combination of letters and digits), and includes a machine-readable bar code that translates into the same number as is humanly readable which allows the greeting card assembly provider to inventory the envelopes 12, and to provide the greeting card assembly 8 to retail stores as an over-the-counter product, much like any other product found in a retail store, or on a consignment basis.

Further, the liner also preferably includes a UPC identifier (not shown) to provide inventory tracking and pricing information for the envelope 12. The UPC identifier on the liner 90 is in addition to the UPC identifier on the greeting card 10, and thus allows independent inventory tracking of the greeting cards and envelopes.

Operation

In operation, the greeting card assembly is provided for resale, such as to retail stores. Preferably, the envelopes 12, having the hidden calling card access identifiers 14, are maintained in a safe place behind the counter at the retail store. The greeting card 10 is preferably maintained on a display rack to allow consumers to browse through the cards to choose the desired card. The tab portion 40 alerts the consumer that a special envelope, i.e., envelope 12, is necessary for providing prepaid, predetermined long distance calling credit to an intended recipient. Pursuant to the instruction of tab portion 40, the consumer should take the desired greeting card 10 to the counter at the retail store, and should tell the clerk how much prepaid long distance credit the consumer desires to purchase. The envelopes 12 are preferably color coded to indicate varying amounts of prepaid long distance credit, such as 5, 10, and 20 minute increments. The clerk can therefore sell the appropriate envelope 12 with the greeting card 10 as a package to the consumer.

Thereafter, the consumer, or greeting card sender, can tear off tab portion 40 at the perforations 42 so that the card 10 can be placed within the inside pocket 72 of envelope 12. As is well-known, flap 76 includes a sticky portion that can be moistened to maintain the flap 76 in the closed position, thereby securely and safely maintaining the greeting card 10 in the envelope 12. Upon receipt of the envelope 12 and greeting card 10 by the intended recipient, the recipient can open the envelope 12, and read the greeting portion 30 and 34 of the greeting card 10, as well as any personalized greetings provided by the greeting card sender. Further, the greeting card 10 includes instructional section 32 which alerts the recipient that the greeting card assembly includes prepaid long distance credit, as well as alerts the recipient that the attached envelope includes detailed instructions for using the prepaid long distance credit. The envelope 12 preferably includes a warning on the outside of the envelope 12 warning the recipient not to discard the envelope. The liner 90, which is attached to the envelope 12, includes instructions for pulling out the second portion 102 of liner 90, and for separating the calling card 122 at the perforations 120 from the second portion 102 of liner 90.

The calling card 122 includes instructions for using the prepaid long distance telephone credit. Because the calling card 122 is sized as traditional telephone calling cards, the calling card 122 can be maintained in a safe and easily accessible location, such as a wallet.

The opaque coating 110 can be scraped off, or otherwise removed from, the calling card 122, as described above, to reveal the calling card access identifier 14. The opaque covering 110 can be removed either before or after the calling card 122 is removed from the second portion 102 of liner 90.

From the foregoing, it will be seen that this invention is one well-adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A greeting card assembly constructed to enable a recipient designated by a sender to remotely credit telephone charges against a prepaid account thereby enabling the recipient to selectively and interactively communicate with a person by telephone, the greeting card assembly comprising:

the combination of a greeting card and an envelope having an inside pocket adapted to receive and hold the greeting card; and a unique visually-discernible calling card access identifier associated with the combination, the access identifier designating the prepaid account having a predetermined amount of telephone calling credit against which telephone calls can be charged.

2. The greeting card assembly of claim 1 wherein the calling card access identifier is affixed to the envelope.

3. The greeting card assembly of claim 2 wherein the access identifier is on a telephone calling card that is removably attached to the envelope.

4. The greeting card assembly of claim 2 further comprising a liner movably attached to the envelope, and wherein the calling card access identifier is affixed to the liner.

5. The greeting card assembly of claim 4 wherein the liner comprises perforations surrounding the calling card access identifier to facilitate selective removal of a section of the liner having the access identifier affixed thereto, the removable section generally defining a telephone calling card.

6. The greeting card assembly of claim 5 wherein the envelope comprises a flap for selectively closing the inside pocket of the envelope, and wherein a first portion of the liner is fixedly attached to the flap and a second portion of the liner is tucked into the inside pocket of the envelope, and further wherein the perforations surrounding the calling card access identifier are formed on the second portion of the liner, so that the second portion of the liner can be removed from the inside pocket of the envelope and the section of the liner surrounded by the perforations can be selectively removed from the liner at the perforations.

7. The greeting card assembly of claim 4 wherein the assembly further comprises an opaque covering affixed to the liner and positioned to hide the calling card access identifier, the covering being selectively removable from the card for allowing viewing of the calling card access identifier.

8. The greeting card assembly of claim 7, further comprising a unique product reference identifier on each card adapted to provide inventory information related to the greeting card assembly.

9. The greeting card assembly of claim 8 further comprising a relatively permanent transparent coating affixed to the liner over the calling card access identifier and adapted to prevent inadvertent removal of the identifier from the liner, the transparent coating being positioned under the opaque covering so that the transparent coating provides a bonding surface to which the opaque covering may reliably and evenly adhere.

10. The greeting card assembly of claim 9 wherein the opaque covering comprises a colored wax covering that adheres to the surface of the transparent coating.

11. The greeting card assembly of claim 10 wherein the section of the liner surrounded by the perforations is appropriately sized to provide space for affixing information relating to the use of the calling card.

12. The greeting card assembly of claim 7 wherein the envelope comprises a color coding adapted to indicate the amount of predetermined long distance credit associated with the credit card access identifier.

13. The greeting card assembly of claim 7 wherein the greeting card further comprises a tab portion adapted to indicate that the envelope is necessary for operation of the greeting card assembly.

14. The greeting card assembly of claim 13 wherein the tab portion is affixed to a top portion of the greeting card so that the tab portion extends upwardly.

15. The greeting card assembly of claim 14 wherein the tab portion is removably attached to the greeting card so that the tab portion is removable prior to being placed in the envelope.

16. The greeting card assembly of claim 15 wherein the tab portion is attached to the greeting card by perforations.

17. A method for enabling a consumer to provide telephone calling credit to a recipient through a greeting card to enable the recipient to selectively and interactively communicate with a person, the method comprising the steps of:

establishing a prepaid account having a calling credit associated therewith;

providing a combination comprising a greeting card and an envelope having an inside pocket adapted to receive and hold the greeting card;

providing a unique visually-discernible calling card access identifier with the combination prior to purchase of the combination by the consumer, the access identifier designating the prepaid account having a predetermined amount of telephone calling credit against which telephone calls can be charged; and sending the combination and the access identifier to the recipient with instructions to use the access identifier to call a telephone number selected by the recipient, the call to be charged against the credit in the prepaid account.

18. The method of claim 17 wherein the method further comprises affixing the access identifier to the envelope.

19. The method of claim 18 wherein the method step of affixing the identifier to the envelope comprises movably securing a liner to the envelope, and affixing the calling card access identifier to the liner.

20. The method of claim 19 wherein the method further comprises forming perforations on the liner that surround a section of the liner that is selectively removable at the perforations.

21. The method of claim 20 wherein the step of forming perforations comprises forming the perforations to create the surrounded section of the liner generally in the shape of a telephone calling card.

22. The method of claim 20 further comprising the step of forming an opaque covering on the liner over the calling card access identifier to hide the access identifier, the covering being selectively removable from the liner for allowing viewing of the access identifier.

23. The method step of claim 22 further comprising the step of affixing a unique product reference identifier to the envelope for providing inventory information related to the greeting card assembly.

24. The method of claim 23 further comprising the step of placing a transparent coating on the liner positioned to cover the calling card access identifier to prevent inadvertent removal of the identifier from the liner, wherein the transparent coating is placed under the opaque covering and provides a bonding surface to which the opaque covering may reliably and evenly adhere.

25. The method of claim 24 further comprising the step of assigning to each calling card access identifier a specific dollar amount or time allotment of long distance services.

26. The method of claim 25 wherein the step of placing an opaque covering on the liner comprises depositing a colored wax covering on the transparent coating that adheres to the surface of the coating so that the covering can be easily removed to reveal the calling card access identifier.

27. The method of claim 26 further comprising the step of affixing a UPC identifier to the greeting card for providing product information related to the greeting card.

28. The method of claim 19 wherein the method further comprises color coding the envelope to indicate the amount of time allotted to the calling card access number affixed to the liner associated with the envelope.

29. The method of claim 28 wherein the method further comprises removably attaching a tab portion to the greeting card for indicating that the envelope is necessary for obtaining a greeting card capable of providing calling credit.

30. The method of claim 29 wherein the method further comprises affixing information to the greeting card relating to use of the greeting card and envelope for prepaid calling credit.

31. The method of claim 30 wherein the method further comprises the step of affixing information to the liner relating to use of the calling card access identifier for prepaid calling credit.

32. A method of providing access to long distance telephone services, the method comprising:

providing a greeting card;

providing an envelope having an inside pocket adapted to receive and hold the greeting card;

providing a liner having a first and second portion, the second portion of the liner being movably secured to the first portion of the liner;

securing the first portion of a liner to the envelope;

affixing a unique, visually discernible calling card access identifier to the second portion of the liner, the access identifier designating a prepaid account having a predetermined amount of telephone calling credit against which telephone calls can be charged;

forming perforations on a section of the second portion of the liner that surrounds the calling card access identifier, the surrounding section being selectively removable from the liner at the perforations; and forming an opaque covering on the liner over the calling card access identifier to hide the access identifier, the covering being selectively removable from the liner for allowing viewing of the access identifier.

33. The method of claim 32 wherein the method further comprises depositing a transparent coating on the liner positioned to cover the calling card access identifier to prevent inadvertent removal of the calling card access identifier from the card.

34. A method of providing access to telephone services, the method comprising:

providing a greeting card;

providing an envelope having an inside pocket adapted to receive and hold the greeting card;

providing a liner having a first and second portion, the second portion of the liner being movably secured to the first portion of the liner;

securing the first portion of the liner to the envelope;

affixing a unique, visually discernible calling card access identifier to the second portion of the liner, the access identifier designating a prepaid account having a predetermined amount of telephone calling credit against which telephone calls can be charged;

affixing a unique product reference identifier to the envelope for providing inventory information related to the envelope; and assigning to the calling card access identifier a specific dollar amount or time allotment of long distance services and printing the same on the liner.

35. A greeting card assembly constructed to enable a recipient designated by a sender to remotely credit telephone charges against a prepaid account thereby enabling the recipient to selectively and interactively communicate with a person by telephone, the greeting card assembly comprising:

a greeting card;

an envelope having an inside pocket adapted to receive and hold the greeting card; and a calling card, inside the envelope, having an access identifier thereon, the access identifier designating the prepaid account having a predetermined amount of telephone calling credit against which telephone calls can be charged.

36. A method for enabling a consumer to provide telephone calling credit to a recipient through a greeting card to enable the recipient to selectively and interactively communicate with a person, the method comprising the steps of:

providing a combination of the greeting card and an envelope sized to receive the greeting card;

providing prepaid calling credit for use with the combination, the prepaid calling credit being associated with a calling credit account identified by an access identifier, said credit being adapted to be used by the recipient of the combination to make a telephone call to a telephone number selected by the recipient; and maintaining the access identifier secret at least until the combination is purchased by the consumer.

37. A method for enabling a consumer to provide telephone calling credit to a recipient through a greeting card to enable the recipient to selectively and interactively communicate with a person, the method comprising the steps of:

providing a combination of the greeting card and an envelope sized to receive the greeting card;

providing prepaid calling credit for use with the combination, the prepaid calling credit being associated with a calling credit account identified by an access identifier on an object, said credit being adapted to be used by the recipient of the combination to make a telephone call to a telephone number selected by the recipient;

secreting said object in a place remote from the greeting card to thereby conceal the access identifier prior to purchase of the greeting card by the consumer; and combining the greeting card and said object at the time of said purchase.

\* \* \* \* \*